(12) United States Patent
Suonsivu et al.

(10) Patent No.: US 6,542,581 B2
(45) Date of Patent: Apr. 1, 2003

(54) METHOD FOR CONTROLLING THE TRANSMISSION POWER IN A DIGITAL SUBSCRIBER LINE

(75) Inventors: Heikki Suonsivu, Espoo (FI); Seppo Savolainen, Helsinki (FI); Juri Sipila, Espoo (FI); Timo Rossi, Espoo (FI); Tomi Tirri, Espoo (FI)

(73) Assignee: VDSL Systems (FI)

( * ) Notice: Subject to any disclaimer, the term of this patent is extended or adjusted under 35 U.S.C. 154(b) by 0 days.

(21) Appl. No.: 09/780,900

(22) Filed: Feb. 9, 2001

(65) Prior Publication Data
US 2002/0136357 A1 Sep. 26, 2002

(51) Int. Cl.⁷ .................................................. H04M 1/24
(52) U.S. Cl. ............... 379/1.04; 379/27.01; 379/32.04; 379/24; 379/22.08; 379/1.01; 379/1.03; 375/227
(58) Field of Search ............................. 379/1.04, 10.01, 379/12, 21, 22, 22.02, 22.04, 22.08, 24, 27.01, 27.02, 27.03, 28, 29.01, 29.03, 29.05, 29.1, 30, 31; 370/241, 242, 247, 248, 249; 375/224, 225, 227, 222

(56) References Cited

U.S. PATENT DOCUMENTS

| | | | | | |
|---|---|---|---|---|---|
| 5,295,159 A | * | 3/1994 | Kerpez | ...................... | 379/1.04 |
| 5,832,387 A | * | 11/1998 | Bae et al. | .................... | 455/522 |
| 6,002,671 A | * | 12/1999 | Kahkoska et al. | ............ | 379/27 |
| 6,061,393 A | * | 5/2000 | Tsui et al. | .................. | 375/227 |
| 6,061,427 A | * | 5/2000 | Ryoo | ............................. | 379/1 |
| 6,226,356 B1 | * | 5/2001 | Brown | ........................ | 379/24 |
| 6,317,495 B1 | * | 11/2001 | Gaikwad et al. | ............ | 379/417 |
| 6,408,165 B1 | * | 6/2002 | Raissinia et al. | ........... | 455/522 |

* cited by examiner

*Primary Examiner*—Rexford Barnie
(74) *Attorney, Agent, or Firm*—Fasth Law Offices; Rolf Fasth

(57) ABSTRACT

The method is for controlling the transmission power for a session in a system when transmitting data via a telephone line by using a digital subscriber line between a user terminal and a central unit. The transmission power is increased or decreased between given limit values so that the transmission power is kept as low as possible while still providing a sufficient transmission quality. The transmission quality, and therefore the transmission power, is controlled by the value of the signal-to-noise ratio and the number of bit errors BER within a given time interval.

10 Claims, 4 Drawing Sheets

METHOD FOR CONTROLLING THE TRANSMISSION POWER IN A DIGITAL SUBSCRIBER LINE

TECHNICAL FIELD

Figure 1:
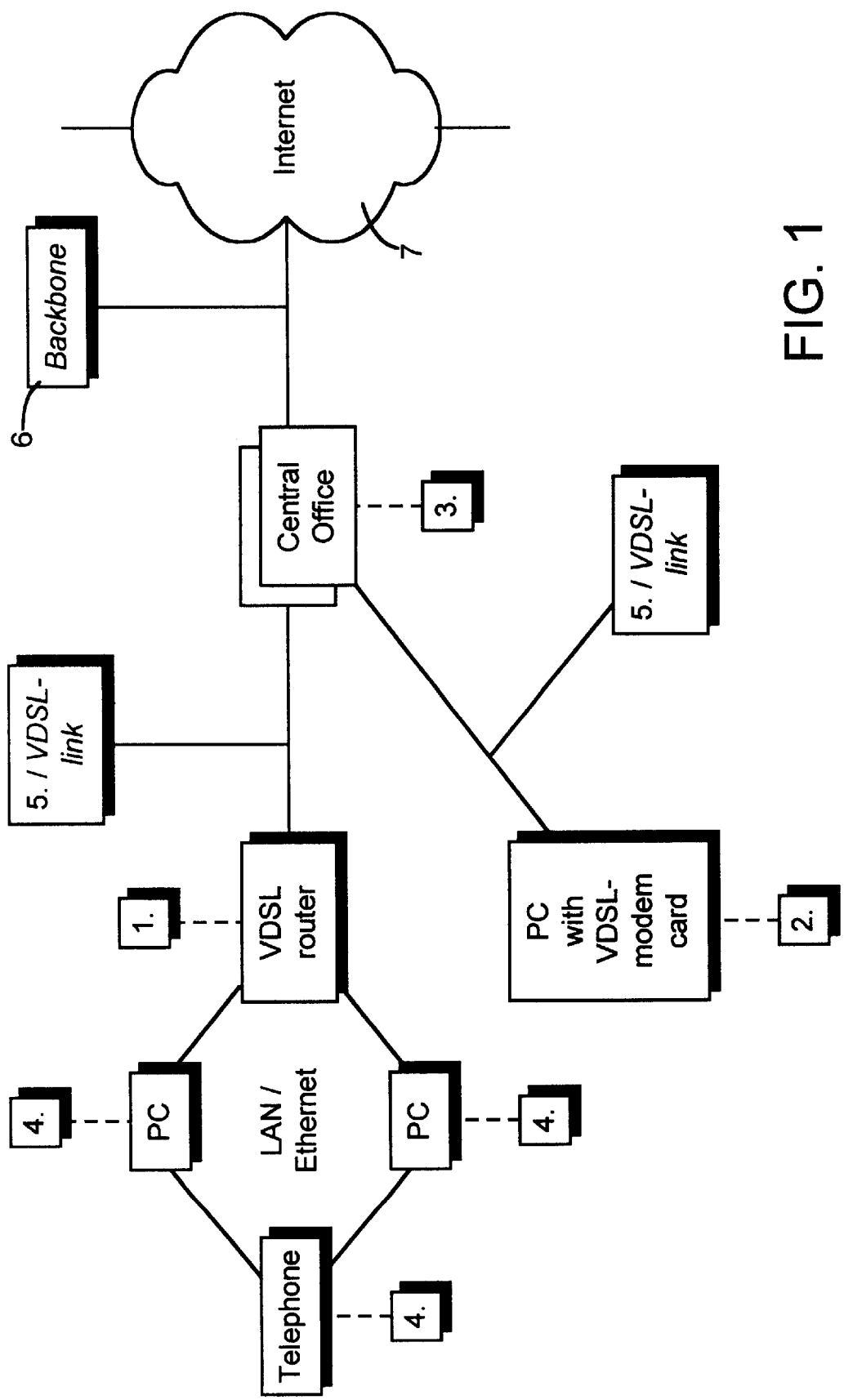

The present invention relates to a method for controlling the transmission power in a system for transmitting data via a telephone line by using a digital subscriber line.

TECHNICAL BACKGROUND

Telephone line connections have to fulfil certain requirements to achieve good connection quality. Standardisation organisations, such as The International Telecommunication Union, ITU-T, has constructed recommendations that specify these requirements. Limit values for a number of important transmission parameters together define the quality requirements of a connection between two subscribers.

Basically, it is question about the degree of distortion allowed in the information sent from a sender to a receiver. There are different techniques that can be used to measure how the information is changed. Different transmission parameters can be used as measure values for these measurements.

Modulation is a technique used for both analogue and digital information in which the information is sent as changes in a carrier signal. The unit that performs the modulation and the corresponding demodulation is called a modem, consisting of a modulator and a demodulator. With modulation it is possible to send digital binary information on analogue carrier, such as radio waves. In digital information transmission, wherein the information is sent as a sequence of "0s" and "1s" on a carrier wave, the bandwidth, i.e. the transmission capacity, is given in bits per second, bit/s. The bit rate can be increased on bandwidth limited connections, such as telephone cables and limited frequency bands at radio communication to have as many bits per Hertz as possible in the signal. Examples of such modulation methods are Frequency Shift Keying, FSK or Phase Shift Keying, PSK and Amplitude Shift Keying, ASK and combinations of these. The combination of e.g. PSK and ASK is called Quadrature Amplitude Modulation, QAM and enables more bits per second than any single method. The use of QAM requires a strong signal so that the single bits can be distinguished in demodulation.

The most common quality parameter in digital networks is the bit error rate, BER. The number of erroneously received bits at the receiver is a measure of the quality of the connection, expressed as the average portion of erroneously bits received of the total number of transmitted bits. BER is the number of erroneous bits in one time slot divided by the number of checked bits. In the practice, the bit errors appear in "bursts", which means that the time aspect has to be taken into consideration in the definition of the quality of the connection. A given number of bit errors can be tolerated as methods for automatic correction of bit errors exist. These methods can handle bit errors to a certain extent.

Noise in the data connections is the most frequent reason for bit errors. No systems can today be made completely without noise, but there are limits for how much noise can be tolerated. The level of noise itself is not so important, instead the ratio between the level of the transmitted signal and the noise, The Signal Noise Ratio (S/N), is decisive for the audibility.

Cross-talk appearing in cable pairs working in opposite directions is another reason for bit errors. Both near-end cross-talk (NEXT) and far-end cross-talk (FEXT) take place in digital systems; NEXT between cable pairs working in opposite directions and FEXT between cable pairs working in the same transmission direction. NEXT is the bigger problem, since it is caused by an outgoing signal that is strong compared to the incoming one in the other cable pair.

Different transmission media are used for transmission, of which the most important are the copper cable (such as the pair cable or the coaxial cable), optical fibers and radio waves.

New transmission systems for copper access have been developed for allocation of different frequency ranges to telephony and data communication, which enables simultaneous telephony and data traffic over the same copper pair. This family of systems is called xDSL, where DSL stands for digital subscriber line.

The acronym xDSL refers collectively to a number of variations of the DSL (Digital Subscriber Line) technology, which aims at utilizing the information transmission capability of ordinary copper wires to the ultimate possible extent. Known variations that go under the umbrella definition of xDSL are at the priority date of this patent application ADSL (Asymmetric Digital Subscriber Line), CDSL (Consumer DSL, registered trademark of Rockwell International Corp.), G. Lite (also known as DSL Lite, splitterless ADSL, and Universal ADSL; officially ITU-T standard G-992.2), HDSL (High bit-rate DSL), RADSL (Rate-Adaptive DSL), SDSL (Symmetric DSL), VDSL (Very high data rate DSL) and even to some extent UDSL (Unidirectional DSL), which is only a proposal, and IDSL (ISDN DSL), which is actually closer to ISDN (Integrated Services Digital Network).

DSL standards sets given limits for the transmission power, which are followed in the implementation level. In general, digital subscriber line system implementations transmit a signal at a predetermined fixed transmission power level, when transmitting data through a telephone line. Preferably, the transmission power level should be sufficiently high so as to maintain a sufficiently high S/N (signal to noise) ratio. The data transfer rate can be kept high and the signal can be kept strong only with a high S/N ratio. On the other hand, the transmission power level should be sufficiently low so as to reduce any influence on the information due to cross talk between the subscriber lines, wherein the cross talk is proportional to the transmission power level.

The problem with having a fixed transmission power is that the transmission power is unnecessary high from time to time. In reality, the lines of the subscribers may have different conditions of noise. Nevertheless, the transmission power level has been fixed so that in some cases, the fixed transmission power level may be lower or higher than the what would be necessary in relation to the prevailing circumstances. As a result, the system may be influenced by cross talk. In order to reduce the negative effects of the cross talk, the data transfer rate must be lowered. This results in a decrease of the transmission capability and an unnecessary waste of transmission power.

In U.S. Pat. No. 6,061,427 there is presented a transmission power control method in an asymmetric digital subscriber line system. In this solution, the asymmetric digital subscriber line system compares a measured noise margin with a reference value, changes a transmission power level of a transmission signal, step by step, beginning from an initial level and sets the transmission power level to a minimum level as long as the measured noise margin is greater than the reference value.

The object of this invention is to control the transmission power in a more flexible and accurate way.

SUMMARY OF THE INVENTION

The method of the invention controls the transmission power for a session in a system for transmitting data via a telephone line by using a digital subscriber line between a user terminal and a central unit. The transmission power is increased or decreased between given limit values so that the power is kept as low as possible, while still providing sufficient transmission quality. The quality criteria according to which the transmission power is controlled consists of the value of the Signal to Noise Ratio (S/N), and the number of bit errors BER within a given time interval.

The advantageous ways of carrying out the invention appears in the following description.

The transmission power is stepwise increased or decreased in accordance with the values of transmission quality and it is controlled independently in the upstream and downstream links but in the most preferable embodiment taking into account the overall cross-effects of these links.

The transmission power is controlled with an algorithm with the aim of adjusting the transmission power to the prevailing circumstances of S/N and BER in a binder of several copper lines.

The session is initiated with an initial value for the transmission power, and the number of bit errors is then calculated within a given time interval. The transmission power is decreased or increased to keep the BER within a range of a minimum value for BER, $BER_{Min}$ and a maximum value for BER, $BER_{Max}$, while maintaining S/N above a given reference value and the transmission power within given limit values, $P_{min}$–$P_{max}$.

The initial transmission power is the maximum power, the minimum power or some value therebetween. It can e.g. be an average power calculated on the basis of foregoing sessions.

The power is controlled with an algorithm with the aim of adjusting the transmission power to the prevailing circumstances of line qualities in the copper line binder, which depend on cross talk and the signal to noise ratio, S/N, within the binder. The transmission power is decreased or increased within given standardised values. The algorithm always tries to keep the transmission power as low as possible.

The transmission is initiated with an initial value for the power, which necessarily is not the maximum power. The transmission power is controlled between a given minimum value, below which the power is not allowed to be decreased, and a maximum value, above which the power must not be increased. The system calculates the number of errors within a given time interval. A given number of errors is allowed and therefor there is defined a minimum allowed value for errors, $BER_{Min}$ and the highest possible number for errors tolerated, $BER_{Max}$. By decreasing or increasing the transmission power, the algorithm strives to keep the number of bit errors, BER, within these values. Also the S/N has been given a reference value below which S/N must not be decreased as a result of decreasing of the transmission power.

If the number of errors is smaller than $BER_{Min}$ and S/N is bigger than the reference value, the transmission power is decreased step by step keeping the following formula true:

1. Compute BER;
2. If (BER<$BER_{Min}$ AND S/R>S/$R_{Ref}$) then decrease transmission power one step (e.g. 0.4 dB);
3. Go to 1.

S/N can have a value below the reference value, but the algorithm does not decrease the transmission power if S/N is below the reference value. S/N can be lower than the reference value even if the transmission power is at maximum, due to a poor line quality.

If the number of errors is bigger than $BER_{Max}$, the transmission power is changed, i.e. increased or decreased. If the number of errors is within the error range, the transmission power is not changed.

If for example the transmission power is increased as a consequence of that BER is higher than $BER_{Max}$, the BER is followed up to see if the increasing of the transmission power had the desired effect of lowering the BER. If cross-talk, that has a tendency of increasing with increasing transmission power, exist in the system at the time of increasing the transmission power, the result might be that the BER is further increased. Therefore, the algorithm, in the most preferred embodiment of the invention, follows-up the value of BER after the increase of the transmission power, and if BER increased, the transmission power is decreased one step back again.

The increasing or decreasing of the transmission power preferably takes place stepwise. The minimum step can e.g. be 0.4 dBm/Hz. The step sizes that can be used are 0.4 dBm/Hz*n, where n=1, 2, 3, etc. The increasing and decreasing of the transmission power takes place independently in the upstream and downstream connections.

In the following the invention is described by means of a preferred embodiment and an example. The intention is not to limit the invention to those examples. Even if the invention is here described in connection with a VDSL system, the invention can equally well be used in other xDSL systems too.

DRAWINGS

Figure 2:
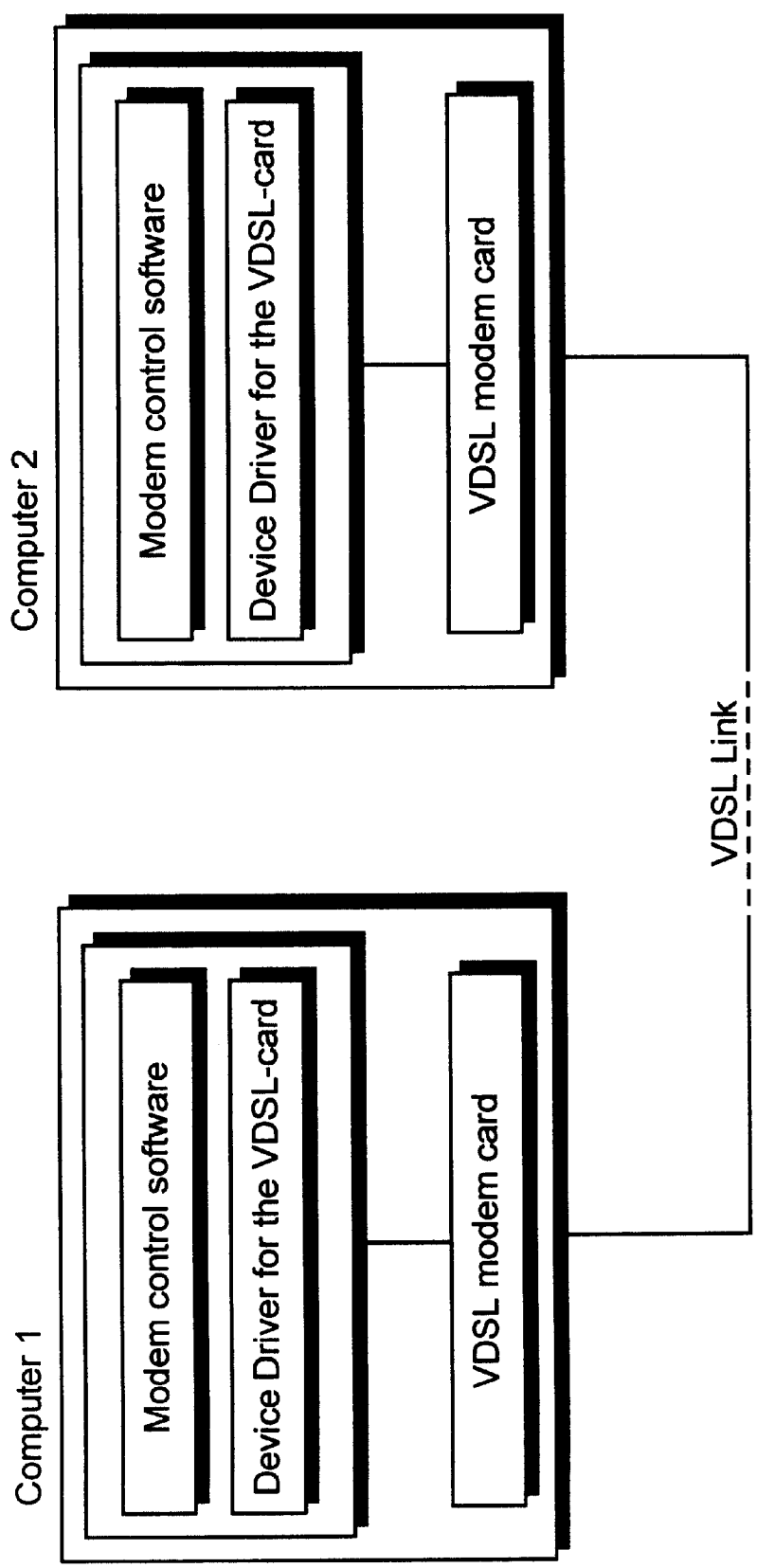
Figure 3:
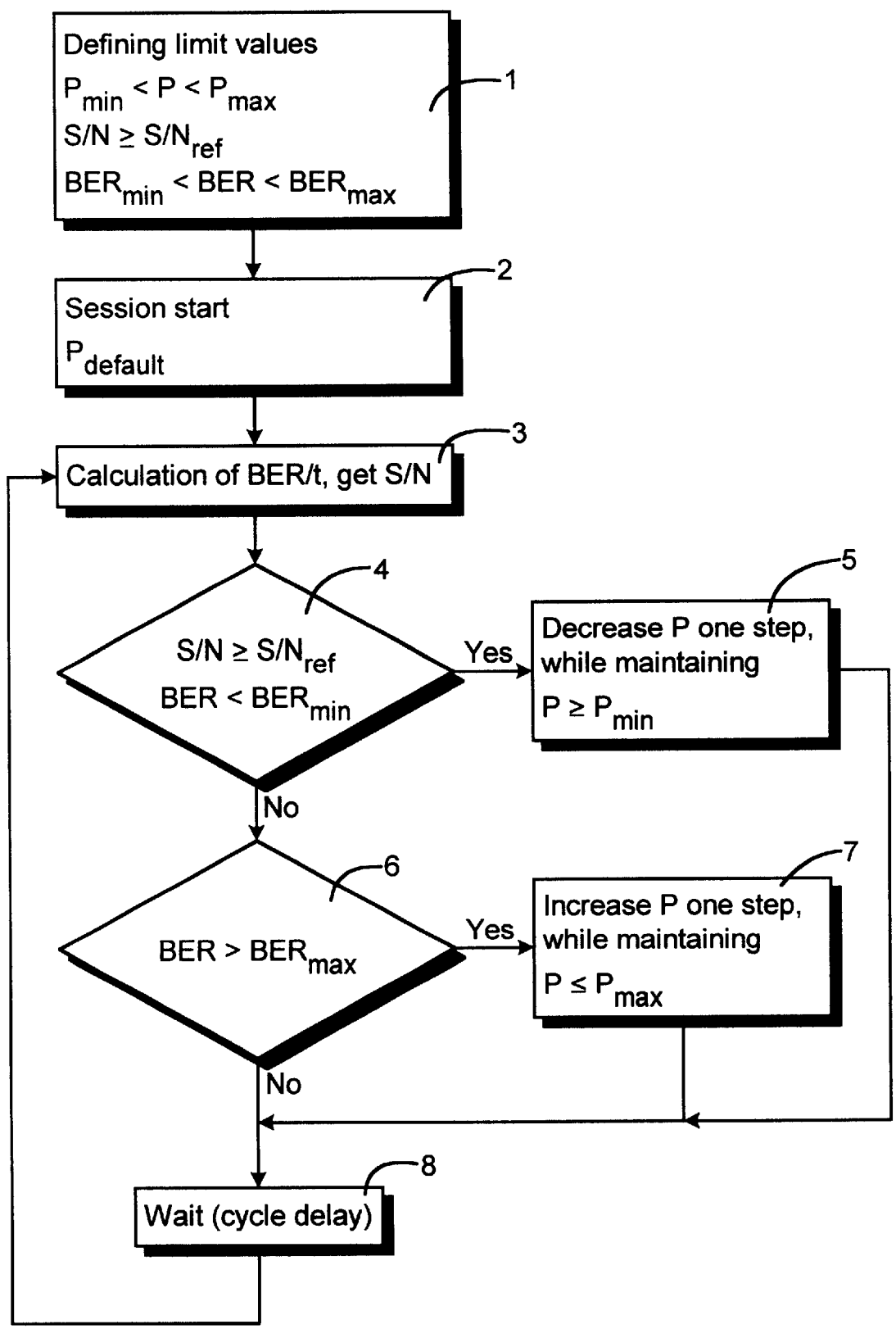
Figure 4:
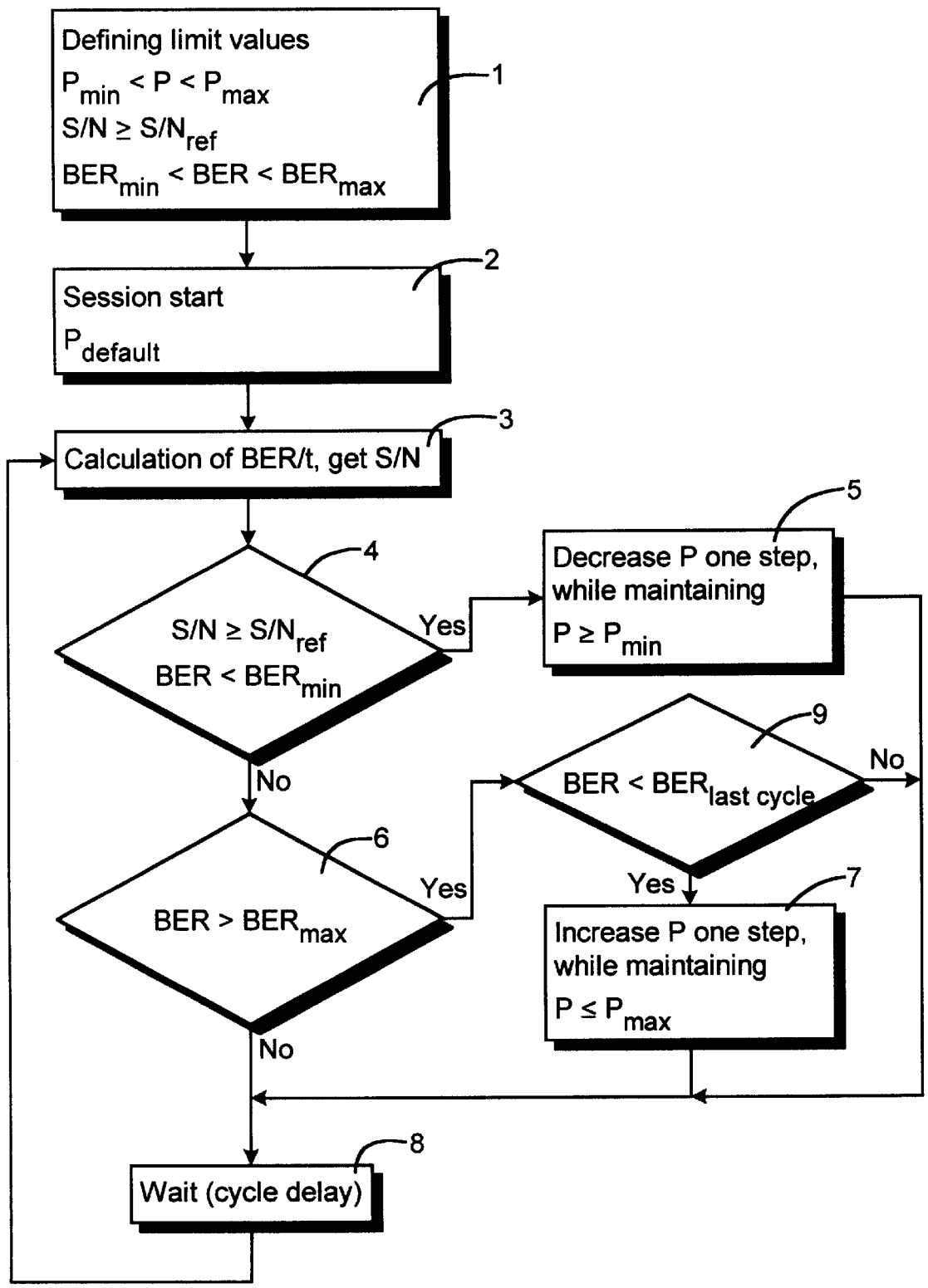

FIG. 1 is a general architecture view example of the environment in which a VDSL system can be used FIG. 2 is a block diagram of a VDSL system to which the present invention is applicable FIG. 3 is a general flow scheme of the method of the invention FIG. 4 is a preferred embodiment of the method of the invention

DETAILED DESCRIPTION OF DRAWINGS

FIG. 1 is a general architecture view example of the environment in which a VDSL system can be used. Different user terminals, such as fixed and mobile telephones 4 and PCs 4 are connected through different kind of local area networks, LAN, (such as ethernet) or wide area networks, WAN, to a VDSL router 1, which will send the data through a VDSL-link 5 to a central office 3. At the central office, a digital subscriber line access multiplexer (DSLAM) aggregates a multiple of VDSL-lines to a single data feed which will be further sent to a backbone network 6 which is a part of the Internet 7. The VDSL-router 1 can be replaced by a VDSL-linecard 2 in cases where only one PC needs to be connected by a VDSL-link 5 to the central office 3 and Internet.

FIG. 2 presents a VDSL-link architecture that connects two systems (computers for example). One of the systems is a master-system and the other is a slave-system. Each of the systems can be divided into two logical units, a software and a hardware system. The software unit consists of two sub-units, the modem control software and a device driver. The device driver can be seen as an interface that allows the modem control software to manipulate the parameters of the modem chip, such as the transmission power. The modem control software monitors the BER and S/N values as described and modifies the parameters of the modem chip if necessary. The hardware unit contains the actual VDSL modem card. These two systems are connected to each other via a VDSL-link.

FIG. 3 is a general flow scheme of the method of the invention. Briefly, FIG. 3 illustrates the method of the invention step by step. Step 1 defines limit values, step 2 starts the session, step 3 calculates the BER and S/N as described above, step 4 says that If BER is lower than the $BER_{min}$ and S/N is above the reference value then go to step 5, otherwise go to step 6. Step 5 decreases the transmit power with one step, e.g. with 0.4 dBm/Hz*n where n=1 . . . inf, after that go to step 8. The power is, however, never decreased to a value below $P_{min}$. If in step 4, BER is above $BER_{min}$ the next step is step 6. If BER in step 6 is higher than the higher limit (the maximal value for BER) then the next step is step 7 otherwise step 8. Step 7 increases the transmission power with one step. The power is, however, never increased to a value above $P_{max}$. If in step 6, BER is below $BER_{max}$ the next step is step 8. Step 8 defines the cycle_delay seconds to wait, and thereafter tells to go back to step 3. After that step 5 or step 7 is performed, the algorithm goes to step 8.

Given limit values are given for some transmission parameters, as defined in forward in step 1 of FIG. 3. The transmission power is defined to be within a given range $P_{min}$–$P_{max}$. A reference value is also given for the signal noise ratio below which S/N is not allowed to be. The bit error ratio BER also has to be between a given range $BER_{min}$–$BER_{max}$.

A given default value is given for the transmission power, which necessarily is not the maximal power but it has to be higher than the minimum value for the value and lower than the maximal value, $P_{min} \leq P \leq P_{max}$. Upon starting the session, a microprocessor sets the (initial) transmission power level to the initial transmission power as defined in the configuration or to a default value if there is no configuration for the initial transmission power between this range (step 2). Initial configurations are planned to assure the initialisation of connection when the optimisation will be made after the link has been created.

Example values:
1. BER: A range for BER could be from 2.5 to 5.0 (Errors/second), the BER is an average of bit errors measured during some time, the algorithm defaults to one minute, but it can be configured otherwise. $BER_c$ is the bit errors during one cycle (more about it later).

$$BER = \frac{\sum BER_c}{t},$$

where t is 60 seconds (by default).
2. P: A range for P could be from 15 to 45 dBm/Hz, and initial P could be 35 dBm/Hz. The initial value of P must be in this range. The steps are 0.4 dBm/Hz, so in this case the initial P is 0.4*35=14 dBm/Hz and $P_{Min}$= 0.4*15=6 dBm/Hz and $P_{Max}$=0.4*45=18 dBm/Hz. (Note that the P values are relative to the "absolute" maximum and minimum transmission power, which are up to the specific hardware specifications.)
3. S/N: The reference value for S/N is relative to the speed (If using QAM as a line modulation technique, QAM-constellation determines the line speed) of the connection. For example $S/N_{Ref}$=20.

In step 3 the number of bit errors BER is calculated within a given time interval and the value of S/N is also noted.

There are two different (and independent) time intervals. The first one is the algorithm's internal cycle (cycle_time), which could be for example five seconds. i.e., the cycle is relatively short (a few seconds). Second one is the time interval (sample_time) during which the average BER is calculated, by the default sample_time=cycle_time*N, where N≦1, by default N=12.

BER is calculated in the following manner:

($BER_{sum}$ is the sum of errors during the sample_time.)

1: Read the accumulated bit errors during the last cycle ($BER_c$);
2: Add $BER_c$ to $BER_{sum}$ ($BER_{sum}=\Sigma BER_c$);
3: Divide $BER_{sum}$ with the sample time thus resulting in BER (bit errors/second)

$$BER = \frac{BER_{sum}}{t}.$$

After a given time, the limit values given for the systems are checked. If BER is below $BER_{min}$ and $S/N \leq S/N_{ref}$ (step 4), the power is decreased in step 5 with one step, while maintaining $S/N \leq S/N_{ref}$. But if the answer in step 4 is "no" and it is in step 6 found that $BER>BER_{max}$, the power is increased in step 7 with one step. If the answer in step 6 is no, the algorithm goes back to step 3 after a certain delay, which might be a few seconds. Steps 3–8 are repeated until the end of the session.

The flow scheme of FIG. 3, however, describes an example of the method in conditions, wherein cross-talk does not need to be taken into consideration.

When the effect of the cross-talk is taken into consideration, the algorithm used in the method of the invention can not categorically decrease or increase the transmission power P, only if BER is above or below the reference limits. Instead, the algorithm additionally, after having increased the transmission power, has to follow up if BER will increase or decrease as a result of the change of the power and increase the transmission power accordingly. If $BER>BER_{Max}$ in step 6, there is an additional criteria in step 9 according to which BER has to be <than the BER at the last cycle before the transmission power can be increased in step 7. If the condition of step 9 is not fulfilled, the algorithm goes to step 8. Thus, If the value of BER has not changed in the intended direction (i.e. decreased) as a result of the foregoing change in the power, the transmission power can not be increased, since that would further increase the value of BER as a result of cross-talk in the line. Instead, the algorithm goes to step 8 even if $BER>BER_{Max}$ in step 6.

For example, if BER is above the maximum value, and P has to be increased according to the equation, the increase in P is not continued if BER is increased even more as a result of this operation.

EXAMPLE

Initialization in steps 1 and 2 with the following values: $P_{Min}$=10 dBm/Hz, $P_{\_Max}$=50 dBm/Hz, P=40 dBm/Hz, $BER_{Min}=1.0$, $BER_{Max}=7.5$, $S/N_{Ref}=25.0$, transmission power step size=1, cycle_delay=5 seconds.

Step 3. First $BER_c$ is read from the modemchip's registers, BER is calculated as described above and S/N is read from the modemchip's registers. Example values could be BER=0.25 and S/R=35.0.

In step 4, BER is compared with $BER_{Min}$ and S/N is compared with $S/N_{Ref}$. In this situation, BER (0.25) is lower than $BER_{Min}$ and S/N (35.0) is higher than $S/N_{Ref}$, so the algorithm goes to step 5 decreasing the transmit power with one step, and now P is 39 dBm/Hz. After that the algorithm waits the five seconds cycle_delay time (step 8) and goes back to step 3.

In step 3, $BER_c$ is read from the modemchip's registers, BER is calculated as before and S/N is read from the modemchip's registers. Example values could be BER=0.75 and S/N=34.0.

In step 4, BER is compared with $BER_{Min}$ and S/N is compared with $S/N_{Ref}$. In this situation, BER (0.75) is lower than $BER_{Min}$ and S/N (34.0) is higher than $S/N_{Ref}$, so the algorithm goes to step 5 decreasing the transmit power with one step (P is 38). After that the algorithm waits the cycle_delay time (step 8) and goes back to step 3.

In step 3, $BER_c$ is read from the modemchip's registers, BER is calculated as before and S/N is read from the modemchip's registers. Example values could be BER=1.5 and S/N=33.5.

In step 4, BER is compared with $BER_{Min}$ and S/N is compared with $S/N_{Ref}$. In this case BER is higher than $BER_{Min}$, so the algorithm goes to step 6.

In step 6, BER is compared with $BER_{Ref}$, BER is lower than $BER_{Max}$ so the algorithm goes to step 8, waits for a while and goes back to step 3.

In step 3, $BER_c$ is read from the modemchip's registers, BER is calculated as before and S/N is read from the modemchip's registers. Example values could be BER=8.0 and S/N=31.0.

In step 4, BER is compared with $BER_{Min}$ and S/N is compared with $S/N_{Ref}$. In this case BER is higher than $BER_{Min}$ so the algorithm goes to step 6.

In step 6, BER is compared with $BER_{Max}$, BER is now higher than $BER_{Max}$ so the algorithm goes to step 7, increasing P with one step (p is 39). After that the algorithm goes to step 8, waits for a while and goes back to step 3.

In step 3, $BER_c$ is read from the modemchip's registers, BER is calculated as before and S/N is read from the modemchip's registers. Example values could be BER=5.0 and S/N=32.0.

In step 4, BER is compared with $BER_{Min}$ and S/N is compared with $S/N_{Ref}$. In this case BER is higher than $BER_{Min}$ so the algorithm goes to step 6.

In step 6, BER is compared with $BER_{Max}$, BER is lower than $BER_{Max}$ so the algorithm goes to step 8, waits for a while and goes back to step 3.

And so forth.

What is claimed is:

1. A method for controlling a transmission power for a session in a system when transmitting data via a telephone line, comprising:
   (a) transmitting the data via the telephone line by using a digital subscriber line between a user terminal and a central unit, the digital subscriber line being powered by a transmission power;
   b) comparing a signal-to-noise (S/N) ratio with a S/N reference ratio;
   c) comparing a bit-error-rate (BER) value with a BER minimum value;
   d) decreasing the transmission power when the S/N ratio is greater than the S/N reference ratio and when the BER minimum value is greater than the BER value;
   e) maintaining the transmission power above a transmission power minimum;
   f) comparing the BER value with a BER maximum value, and
   g) increasing the transmission power when the BER value is greater than the BER maximum value;

2. The method according to claim 1 wherein the method further comprises decreasing or increasing the transmission power in incremental steps based on values of a transmission quality.

3. The method according to claim 1 wherein the method further comprises independently controlling the transmission power in links that are upstream and downstream of the digital subscriber line.

4. The method according to claim 1 wherein the method further comprises adjusting the transmission power based on a prevailing signal-to-noise-ratio value and bit error rate of the digital subscriber line.

5. The method according to claim 1 wherein the method further comprises:
   initializing the session with an initial value for the transmission power;
   calculating the bit error rate within a given time interval;
   decreasing or increasing the transmission power to keep the bit error rate greater than a minimum bit error rate value and less than a maximum bit error rate value;
   maintaining the signal-to-noise ratio greater than a predetermined reference value; and
   maintaining the transmission power greater than a minimum power value and less than a maximum power value.

6. The method according to claim 5 wherein the initializing step comprises setting the initial value to be equal to the maximum power value.

7. The method according to claim 5 wherein the initializing step comprises setting the initial value to be equal to the minimum power value.

8. The method according to claim 5 wherein the initializing step comprises setting the initial value to be equal to an average power value based on previous sessions.

9. The method according to claim 5 wherein the method further comprises:
   decreasing the transmission power with one incremental step when the bit error rate is below a minimum bit error value and the signal-to-noise ratio is greater than a signal-to-noise reference value;
   increasing the transmission power when the bit error value is greater than a maximum bit error value while maintaining the transmission power to be greater than a minimum power value and less than a maximum power value;
   calculating a new bit error rate after a predetermined time period; and
   adjusting the transmission power based on the new bit error rate until the session is terminated.

10. The method according to claim 9 wherein the method further comprises monitoring the bit error rate when the transmission power is changed and changing the value of the transmission power back to a previous value if the bit error rate is above a maximum allowable value and less than a minimum allowable value.

* * * * *